US012707218B2

(12) United States Patent
Dublin

(10) Patent No.: US 12,707,218 B2
(45) Date of Patent: Aug. 11, 2026

(54) SYSTEMS AND METHODS FOR PROVIDING AUGMENTED ULTRASONIC AUDIO

(71) Applicant: Bose Corporation, Framingham, MA (US)

(72) Inventor: Michael S. Dublin, Arlington, MA (US)

(73) Assignee: Bose Corporation, Framingham, MA (US)

( * ) Notice: Subject to any disclaimer, the term of this patent is extended or adjusted under 35 U.S.C. 154(b) by 293 days.

(21) Appl. No.: 18/397,617

(22) Filed: Dec. 27, 2023

(65) Prior Publication Data

US 2025/0220374 A1 Jul. 3, 2025

(51) Int. Cl.
*H04S 7/00* (2006.01)
*H04R 3/12* (2006.01)

(52) U.S. Cl.
CPC ................. *H04S 7/30* (2013.01); *H04R 3/12* (2013.01); *H04R 2499/13* (2013.01)

(58) Field of Classification Search
None
See application file for complete search history.

(56) References Cited

U.S. PATENT DOCUMENTS 6,778,672 B2 8/2004 Breed et al.
2016/0336022 A1 11/2016 Florencio
2022/0141611 A1* 5/2022 Oswald .................. H04R 1/403 381/302
2022/0196518 A1* 6/2022 Bishop ................... G01H 1/003
2023/0224639 A1* 7/2023 Lerner ..................... H04R 3/14 381/71.1
2023/0403529 A1 12/2023 Oswald
2024/0059201 A1* 2/2024 Mossington ........... B60N 2/879

OTHER PUBLICATIONS

Pompei, F. Joeseph, "Sound From Ultrasound: the Parametric Array as an audible Sound Source," Massachusetts Institute of Technology, 2002, pp. 1-132.
Recording of TED Talk entitled "Hypersonic sound and other inventions," by Woody Norris, Feb. 2004, Retrieved from Internet: <https://www.ted.com/talks/woody_norris_hypersonic_sound_and_other_inventions>.
International Search Report and the Written Opinion of the International Searching Authority, PCT Application No. PCT/US2024/058674, dated Mar. 17, 2025, pp. 1-18.

* cited by examiner

*Primary Examiner* — Duc Nguyen
*Assistant Examiner* — Assad Mohammed
(74) *Attorney, Agent, or Firm* — Bond, Schoeneck & King, PLLC

(57) ABSTRACT

A system for providing augmented ultrasonic audio in a vehicle, including a first ultrasonic transducer arranged to direct a first ultrasonic acoustic signal to a first listening zone within a cabin of the vehicle, wherein the first listening zone is disposed at a first seating location; a first plurality of midrange speakers arranged to direct a first binaural midrange acoustic signal to the first listening zone, wherein the first plurality of midrange speakers are each near-field speakers; and a controller configured to drive the first ultrasonic transducer with a first upper range content of a first content signal, such that the first ultrasonic acoustic signal is modulated with the first upper range content, and to drive the first plurality of midrange speakers with a first midrange content of the first content signal such that the first binaural midrange acoustic signal includes the first midrange content.

20 Claims, 6 Drawing Sheets

SYSTEMS AND METHODS FOR PROVIDING AUGMENTED ULTRASONIC AUDIO

BACKGROUND

This disclosure generally relates to systems and method for providing augmented ultrasonic audio in a vehicle cabin, and, particularly, to a method of augmenting the bass response of at least one ultrasonic transducer disposed in a vehicle cabin.

SUMMARY

All examples and features mentioned below can be combined in any technically possible way.

According to an aspect, a system for providing augmented ultrasonic audio in a vehicle, includes: a first ultrasonic transducer arranged to direct a first ultrasonic acoustic signal to a first listening zone within a cabin of the vehicle, wherein the first listening zone is disposed at a first seating location; a first midrange speaker arranged to direct a first midrange acoustic signal to the first listening zone, wherein the first midrange speaker is a near-field speaker; and a controller configured to drive the first ultrasonic transducer with a first upper range content of a first content signal such that the first ultrasonic acoustic signal is modulated with the first upper range content, and to drive the first midrange speaker with a first midrange content of the first content signal such that the first midrange acoustic signal includes the first midrange content.

In an example, the first ultrasonic transducer is one of a first plurality of ultrasonic transducers together directing a first binaural ultrasonic acoustic signal to the first listening zone, wherein the controller is further configured to drive the first plurality of ultrasonic transducers with the first upper range content such that the first binaural ultrasonic acoustic signal is modulated with the first upper range content.

In an example, driving the first ultrasonic transducer with a first upper range content comprises heterodyning a first ultrasonic signal with the first upper range content.

In an example, the first midrange speaker is disposed within at least one of a headrest, a seatback, or a headliner of the cabin.

In an example, the first midrange speaker is one of a first plurality of midrange speakers together directing a first binaural midrange acoustic signal to the first listening zone, wherein the controller is configured to drive the first plurality of midrange speakers with the first midrange content of the first content signal.

In an example, the controller is configured to drive the first plurality of midrange speakers in an array configuration to produce the first binaural midrange acoustic signal in the first listening zone.

In an example, the controller is configured to drive the first plurality of midrange speakers such that the first binaural midrange acoustic signal is perceived by a first user in the first listening zone as originating from a first virtual source location within the vehicle cabin.

In an example, the first ultrasonic transducer is one of a first plurality of ultrasonic transducers together directing a first binaural ultrasonic acoustic signal to the first listening zone, wherein the controller is further configured to drive the first plurality of ultrasonic transducers with the first upper range content such that the first binaural ultrasonic acoustic signal is modulated with the first upper range content.

In an example, the system further includes: a second ultrasonic transducer arranged to direct a second ultrasonic acoustic signal to a second listening zone within a cabin of the vehicle, wherein the second listening zone is disposed at a second seating location; a second midrange speaker arranged to direct a second midrange acoustic signal to the second listening zone, wherein the second midrange speaker is a near-field speaker; wherein the controller is further configured to drive the second ultrasonic transducer with a second upper range content of a second content signal such that the second ultrasonic acoustic signal is modulated with the second upper range content, and to drive the second midrange speaker with a second midrange content of the second content signal such that the second midrange acoustic signal includes the second midrange content.

In an example, the system further includes: a plurality of speakers disposed in a perimeter of a cabin of the vehicle; wherein the controller is further configured to drive the plurality of perimeter speakers in accordance with a first array configuration such that a first bass content of the first content signal is produced in the first listening zone, and to drive the plurality of perimeter speakers in accordance with a second array configuration such that the first bass content is produced in the second listening zone, wherein in the first listening zone a magnitude of the first bass content is greater than a magnitude of the first bass content in the second listening zone.

According to another aspect, at least one non-transitory storage medium storing program code, the program code, when executed by a processor, producing augmented ultrasonic audio in a vehicle, the program code comprising: driving a first ultrasonic transducer with a first upper range content of a first content signal such that a first ultrasonic acoustic signal, output by the first ultrasonic transducer, is modulated with the first upper range content, wherein the first ultrasonic transducer is arranged to direct the first ultrasonic acoustic signal to the first listening zone within a cabin of the vehicle, wherein the first listening zone is disposed at a first seating location; and driving a first midrange speakers with a first midrange content of the first content signal such that a first midrange acoustic signal, output by the first midrange speaker, includes the first midrange content, the first midrange speaker arranged to direct a first midrange acoustic signal to the first listening zone, wherein the first midrange speaker is a near-field speaker.

In an example, the at least one non-transitory storage medium further includes: driving a first plurality of ultrasonic transducers with the first upper range content such that a first binaural ultrasonic acoustic signal, output by the first plurality of ultrasonic transducers, is modulated with the first upper range content, wherein the first ultrasonic transducer is one of the first plurality of ultrasonic transducers.

In an example, driving the first ultrasonic transducer with a first upper range content comprises providing the first upper range content to a mixer to heterodyne a first ultrasonic signal with the first upper range content.

In an example, the first midrange speaker is disposed within at least one of a headrest, a seatback, or a headliner of the cabin.

In an example, the at least one non-transitory storage medium further includes: driving a first plurality of midrange speakers with the first midrange content such that a first binaural midrange acoustic signal, output by the first plurality of midrange speakers, includes the first midrange content, wherein the first midrange speaker is one of a first plurality of midrange speakers.

In an example, driving the first plurality of midrange speakers comprises driving the first plurality of midrange speakers in an array configuration to produce the first binaural midrange acoustic signal in the first listening zone.

In an example, driving the first plurality of midrange speakers comprises driving the first plurality of midrange speakers such that the first binaural acoustic signal is perceived by a first user in the first listening zone as originating from a first virtual source location within the vehicle cabin.

In an example, the at least one non-transitory storage medium further includes: driving a first plurality of ultrasonic transducers with the first upper range content such that a first binaural ultrasonic acoustic signal, output by the first plurality of ultrasonic transducers, is modulated with the first upper range content, wherein the first ultrasonic transducer is one of the first plurality of ultrasonic transducers.

In an example, the at least one non-transitory storage medium further includes: driving a second ultrasonic transducer with a second upper range content of a second content signal such that a second ultrasonic acoustic signal, output by the second ultrasonic transducer, is modulated with the second upper range content, wherein the second ultrasonic transducer is arranged to direct the second ultrasonic acoustic signal to the second listening zone within a cabin of the vehicle, wherein the second listening zone is disposed at a second seating location; and driving a second midrange speakers with a second midrange content of the second content signal such that a second midrange acoustic signal, output by the second midrange speaker, includes the second midrange content, the second midrange speaker arranged to direct a second binaural midrange acoustic signal to the second listening zone, wherein the second midrange speaker is a near-field speaker.

In an example, the at least one non-transitory storage medium further includes: driving a plurality of perimeter speakers in accordance with a first array configuration such that a first bass content of the first content signal is produced in the first listening zone, and driving the plurality of perimeter speakers in accordance with a second array configuration such that the first bass content is produced in the second listening zone, wherein in the first listening zone a magnitude of the first bass content is greater than a magnitude of the first bass content in the second listening zone.

According to another aspect, a system for providing augmented ultrasonic audio in a vehicle, comprising: a plurality of speakers disposed in a perimeter of a cabin of the vehicle; a first ultrasonic transducer arranged within the cabin to direct a first ultrasonic acoustic signal to a first listening zone with the cabin, wherein the first listening zone is disposed at a first seating location; a second ultrasonic transducer arranged within the cabin to direct a second ultrasonic acoustic signal to a second listening zone within the cabin, wherein the first listening zone is disposed at a second seating location; and a controller configured to drive the plurality of speakers in accordance with a first array configuration such that a first bass content of a first content signal is produced in the first listening zone, and to drive the plurality of speakers in accordance with a second array configuration such that a second bass content of a second content signal is produced in the second listening zone, wherein in the first listening zone a magnitude of the first bass content is greater than a magnitude of the second bass content and in the second listening zone the magnitude of the second bass content is greater than the magnitude of the first bass content, wherein the controller is further configured to drive the first ultrasonic transducer with a first upper range content of the first content signal such that the first ultrasonic acoustic signal is modulated with the first upper range content, and to drive the second ultrasonic transducer with a second upper range content of the second content signal such that the second ultrasonic acoustic signal is modulated with the second upper range content.

In an example, the first ultrasonic transducer is one of a first plurality of ultrasonic transducers together directing a first binaural ultrasonic acoustic signal to the first listening zone, wherein the controller is further configured to drive the first plurality of ultrasonic transducers with the first upper range content such that the first binaural ultrasonic acoustic signal is modulated with the first upper range content, the first binaural ultrasonic acoustic signal being perceived by a first user within the first listening zone as originating from a first virtual source location within the vehicle cabin, wherein the second ultrasonic transducer is one of a second plurality of ultrasonic transducers together directing a second binaural ultrasonic acoustic signal to the second listening zone, wherein the controller is further configured to drive the second plurality of ultrasonic transducers with the second upper range content such that the second binaural ultrasonic acoustic signal is modulated with the second upper range content and, the second binaural ultrasonic acoustic signal is perceived by a second user within the second listening zone as originating from a second virtual source location within the vehicle cabin.

In an example, the system further includes: a first midrange speaker arranged to direct a first midrange acoustic signal to the first listening zone, wherein the first midrange speaker is a near-field speaker, wherein the controller is configured to drive the first midrange speaker with a first midrange content of the first content signal such that the first midrange acoustic signal includes a midrange content of the first content signal, wherein the first midrange content is disposed, spectrally, between the first bass content and the first upper range content; and a second midrange speaker arranged to direct a second midrange acoustic signal to the second listening zone, wherein the second midrange speaker is a near-field speaker, wherein the controller is configured to drive the second midrange speaker with a second midrange content of the second content signal such that the second midrange acoustic signal includes a midrange content of the second content signal, wherein the second midrange content is disposed, spectrally, between the second bass content and the second upper range content;

In an example, the first midrange speaker is one of a first plurality of midrange speakers together directing a first binaural midrange acoustic signal to the first listening zone, wherein the controller is configured to drive the first plurality of midrange speakers with the first midrange content of the first content signal, wherein the second midrange speaker is one of a second plurality of midrange speakers together directing a second binaural midrange acoustic signal to the second listening zone, wherein the controller is configured to drive the second plurality of midrange speakers with the second midrange content of the second content signal.

In an example, the controller is configured to drive the first plurality of midrange speakers in an array configuration to produce the first binaural midrange acoustic signal in the first listening zone, wherein the controller is configured to drive the second plurality of midrange speakers in an array configuration to produce the second binaural midrange acoustic signal in the second listening zone.

In an example, the controller is configured to drive the first plurality of midrange speakers such that a first binaural midrange acoustic signal is perceived by a first user in the first listening zone as originating from a first virtual source location within the vehicle cabin, wherein the controller is configured to drive the second plurality of midrange speakers such that a second binaural midrange acoustic signal is perceived by a second user in the second listening zone as originating from a second virtual source location within the vehicle cabin.

The details of one or more implementations are set forth in the accompanying drawings and the description below. Other features, objects, and advantages will be apparent from the description and the drawings, and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various aspects.

DETAILED DESCRIPTION

A vehicle audio system that includes only perimeter speakers is limited in its ability to provide different audio content to different passengers. The leakage of upper-range content between listening zones can be solved by providing each user with a wearable device, such as headphones. If each user is wearing a pair of headphones, a separate audio signal can be provided to each user with minimal sound leakage. But minimal leakage comes at the cost of isolating each passenger from the environment, which is not desirable in a vehicle context. This is particularly true of the driver, who needs to be able to hear sounds in the environment such as those produced by emergency vehicles or the voices of the passengers, but it is also true of the rest of the passengers which typically want to be able to engage in conversation and interact with each other.

This can be resolved, for example, by providing each user with a binaural device, such as near-field speakers disposed in a headrest, that provides each passenger with separate range audio content while maintaining an open path to the user's ears, allowing users to engage with their environment.

Alternatively, ultrasonic speakers can be positioned within the vehicle cabin to direct distinct ultrasonic acoustic signals to the different passengers. The ultrasonic acoustic signals are modulated with the desired content signal (e.g., music, speech, navigation, etc.), and non-linearities inherent to the propagation of the sound waves through the air naturally demodulate the ultrasonic acoustic signal along its path. As a result, a user seated in the path of the ultrasonic acoustic signal will perceive the demodulated content signal as though it originated at the user's ear.

Ultrasonic acoustic signals include the additional benefit of being highly directive and imperceptible to those not within the path, meaning that ultrasonic acoustic signals can be tailored to each user with minimal to no leakage to neighboring users. Ultrasonic acoustic signals, however, have been reported, anecdotally, to produce negative physiological effects, such as headaches, limiting their wide adoption in commercial environments.

Figure 1A:
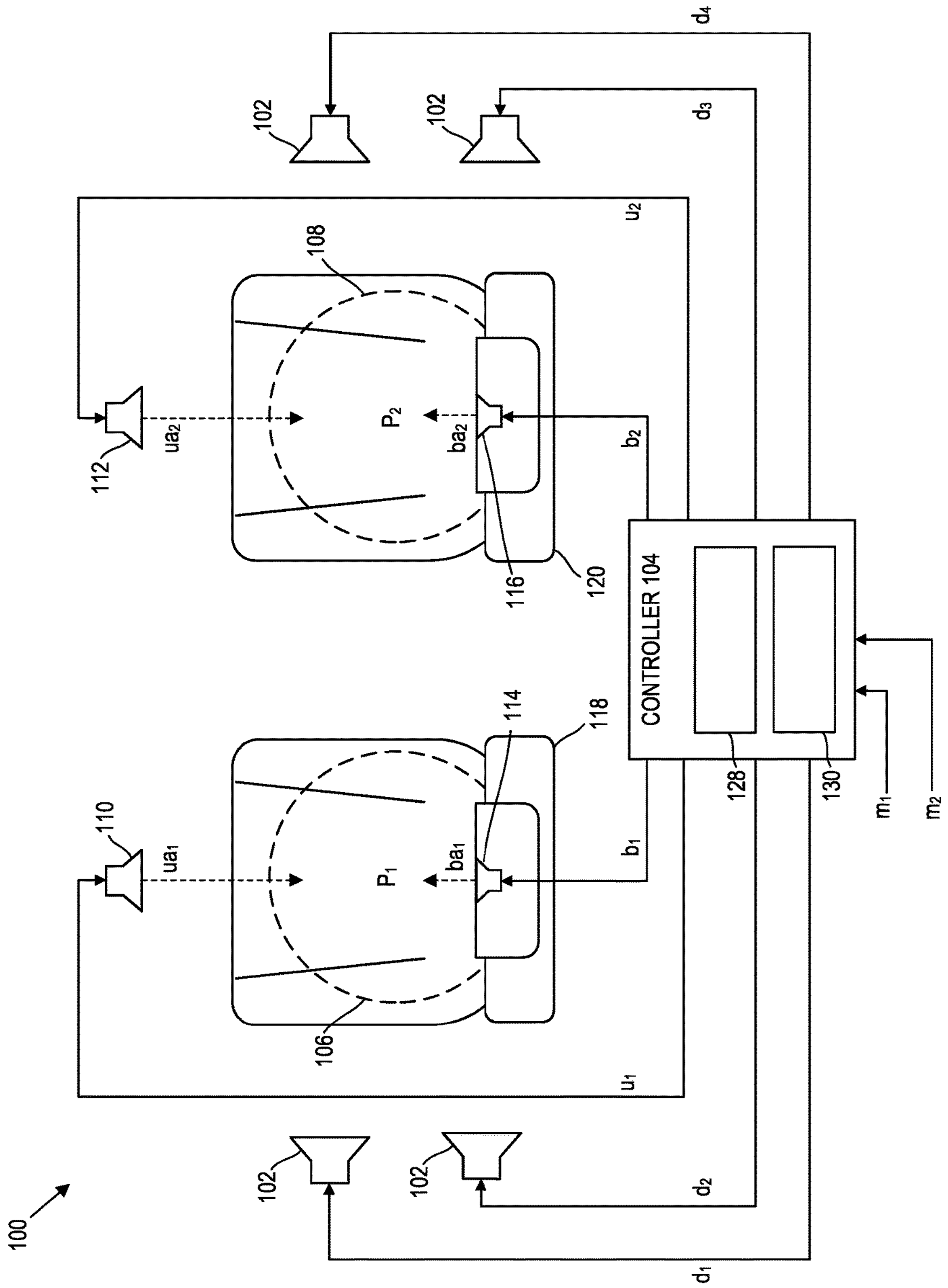
FIG. 1A depicts an audio system for providing augmented ultrasonic audio in a vehicle cabin, according to an example.

Turning now to FIG. 1A there is shown a schematic view representative of the audio system for providing augmented ultrasonic audio in a vehicle cabin 100. As shown, in this example, the vehicle cabin 100 includes a set of perimeter speakers 102, ultrasonic transducers 110, 112, and midrange speakers 114, 116. (For the purposes of this disclosure a speaker is any device receiving an electrical signal and transducing it into an acoustic signal.) A controller 104, disposed in the vehicle, is configured to receive a first content signal $m_1$ and a second content signal $m_2$. The first content signal $m_1$ and second content signal $m_2$ are audio signals (and can be received as analog or digital signals according to any suitable protocol) that each can be divided—by methods such as filtering—into a bass content (i.e., content below 250 Hz±150 Hz), a midrange content (i.e., content from 250 Hz±150 Hz to frequencies up to 2-4 kHz) and an upper range content (i.e., content from 2 kHz-4 kHz and upward). Spectrally, the midrange content is thus between the lower range content and the upper range content. It should, however, be understood that some amount of overlap between these ranges is tolerable and expected at the cross-over frequencies between ranges.

Controller 104 is configured to drive ultrasonic transducers 110, 112 with, at least, the upper content of content signals $m_1$, $m_2$. (For the purpose of this disclosure, transducer and speaker is used interchangeably.) Ultrasonic transducer 110 directs an ultrasonic acoustic signal $ua_1$ to the first listening zone 106 (disposed at a first seating position $P_1$), and ultrasonic transducer 112 directs an ultrasonic acoustic signal $ua_2$ to the second listening zone 108 (disposed at a second seating position $P_2$). Because ultrasonic transducers can be made highly directive, and because only listeners along the path of the acoustic signal can hear the demodulated content, ultrasonic acoustic signals $ua_1$ and $ua_2$ provide good inter-seat isolation. In other words, the ultrasonic acoustic signal $ua_1$ cannot be heard, or can be heard only at very low levels, in the second listening zone. Likewise, the ultrasonic acoustic signal $ua_2$ cannot be heard, or can be heard only at very low levels, in the first listening zone.

The ultrasonic transducers 110, 112 can be driven by controller 104 with the signals $u_1$ and $u_2$, which can comprise the upper range content and midrange content of content signals $m_1$ and $m_2$, respectively. In certain examples, described in more detail below, signals $u_1$ and $u_2$ can be limited to just the upper range of the content signals $m_1$ and $m_2$, with midrange speakers 114, 116, receiving the midrange content, in order to limit the exposure of a given user to ultrasonic acoustic signals, while also improving the isolation of the higher frequencies between seats, which are generally more difficult to isolate to a given listening zone. Where midrange speakers are not utilized, ultrasonic transducers 110, 112 can provide both the midrange content and upper range content.

Because the midrange content and upper range content of signals $m_1$ and $m_2$ are not in the ultrasonic frequency range (which is, at a minimum, greater than 20 kHz, and thus outside the range of human hearing), signals $u_1$ and $u_2$ must include an ultrasonic carrier frequency modulated with the desired content signal (i.e., the upper range of content signals $m_1$ and $m_2$, or the upper and midranges of content signals $m_1$ and $m_2$). This can be accomplished in any number of ways. In one example, a processor of controller 104 can produce the modulated ultrasonic signal directly. Modern processors are clocked at frequencies in the Gigahertz range and are thus capable of producing signals having carrier frequencies in the ultrasonic frequency range. Alternatively, the upper and/or midrange of the content signal $m_1$ or $m_2$ can be mixed (i.e., heterodyned) with the output of a local oscillator producing the carrier frequency.

Figure 2:
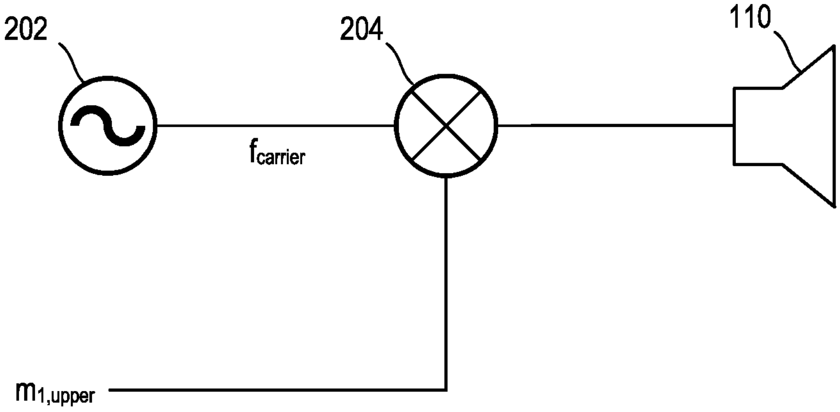
FIG. 2 depicts a block diagram of mixer for heterodyning upper range content of a content signal with an ultrasonic carrier frequency, according to an example.

An example of this is shown in FIG. 2, in which the upper range of signal $m_1$, represented as $m_{1,upper}$, is input to a mixer 204 (also referred to as an upconverter) that also receives the output of a local oscillator 202 producing the ultrasonic carrier frequency signal $f_{carrier}$. The result is that the carrier frequency is modulated with the upper range content of content signal $m_{1,upper}$. This and other ways of creating the modulated drive signals $u_1$ and $u_2$ are contemplated in this disclosure. Further, for the purposes of this disclosure, hardware such as a local oscillator 202 and mixer 204 can be considered associated hardware with any processors of controller 104, defined in more detail below.

While ultrasonic transducers 110, 112 are shown disposed in front of seating positions $P_1$, $P_2$, (e.g., located within the dashboard), ultrasonic transducers 110, 112 can be disposed anywhere suitable for directing an ultrasonic acoustic signal to the intended listening zone (e.g., listening zone 106 or 108) while maintaining at least 3 dB of inter-seat isolation. Other suitable locations include, for example, within the headliner, seats, or within the center console.

As mentioned above, it can be desirable to limit the exposure of a given user to ultrasonic acoustic signals. Thus, in certain examples, midrange speakers 114, 116 can be disposed within the seats 118, 120, respectively directing a midrange acoustic signal $ba_1$, $ba_2$ to listening zones 106, 108. For example, as shown, midrange speakers 114, 116 can be disposed within the headrest of seats 118, 120; however, in alternative examples, midrange speakers 114, 116 can be disposed elsewhere in the seat suitable for delivering the midrange acoustic signal to the respective listening zone. For example, midrange speakers 114, 116 can alternatively be disposed in the seatback (e.g., in line with or above the user's shoulders), headliner, or any other place that is disposed near to the user's ears and suitable for delivering midrange acoustic signals to the user while maintaining at least 3 dB of inter-seat isolation (e.g., a signal produced at seating position $P_1$ by midrange speakers 114L, 114R is at least 3 dB quieter at the seating position $P_1$).

Generally, midrange speakers are near-field speakers, designed to limit inter-seat leakage between listening zones 106, 108. In some examples, midrange speakers 114, 116 can be driven by controller 104 in an array configuration—using beamforming techniques, as are known in the art—to steer the midrange acoustic signal $ba_1$, $ba_2$ toward the desired listening zone, while, in some examples, steering nulls toward the remaining listening zones (i.e., provide inter-seat isolation). For example, midrange speaker 114 can comprise a plurality of speakers arrayed to steer the midrange acoustic signal $ba_1$ toward the first listening zone 106 while steering a null toward the second listening zone 108 (or any other listening zones). Likewise, midrange speaker 116 can comprise a plurality of speakers arrayed to steer the midrange acoustic signal $ba_2$ toward the second listening zone 108 while steering a null toward the first listening zone 106 (or any other listening zones). As a result of such arraying, the magnitude of midrange acoustic signal $ba_1$ can be greater in the first listening zone 106 than the second listening zone 108; likewise, the magnitude of midrange acoustic signal $ba_2$ in the second listening zone 108 can be greater than in the first listening zone 106. In some examples, as a result of the arraying, the magnitude of midrange acoustic signal $ba_1$ can be greater than the magnitude of midrange acoustic signal $ba_2$ by at least 3 dB in the first listening zone 106, and the magnitude of midrange acoustic signal $ba_2$ can be greater than the magnitude of the midrange acoustic signal $ba_1$ by at least 3 dB in the second listening zone (i.e., at least 3 dB of isolation exists between each listening zones). Such arraying may not be necessary where the midrange speakers are positioned close enough to the user's ears that audible volumes can maintained at with at least 3 dB isolation between each listening zone.

The controller 104 can be further configured to drive perimeter speakers 102 with driving signals $d_1$-$d_4$ to form at least a first array configuration and a second array configuration. The first array configuration, formed by at least a subset of perimeter speakers 102, constructively combines the acoustic energy generated by perimeter speakers 102 to produce the bass content of the first content signal $m_1$ in a first listening zone 106 arranged at a first seating position $P_1$. The second array configuration, similarly formed by at least a subset of perimeter speakers 102, constructively combines the acoustic energy generated by perimeter speakers 102 to produce the bass content of the second content signal $m_2$ in a second listening zone 108 arranged at a second seating position $P_2$. Furthermore, the first array configuration can destructively combine the acoustic energy generated by perimeter speakers 102 to form a substantial null at the second listening zone 108 (and any other seating position within the vehicle cabin) and the second array configuration can destructively combine the acoustic energy generated by perimeter speakers 102 to form a substantial null at the first listening zone (and any other seating position within the vehicle cabin).

It should be understood that in various examples there can be some or total overlap between the subsets of perimeter speakers 102 arrayed to produce the bass content of the first content signal $m_1$ in the first listening zone 106 and the subsets of perimeter speakers 102 arrayed to produce the bass content of the second content signal $m_2$ in the second listening zone.

In order to array perimeter speakers 102 to provide bass content to first listening zone 106 and second listening zone 108, controller 104 can implement a plurality of filters that each adjust the acoustic output of perimeter speakers 102 so that the bass content of the first content signal $m_1$ constructively combines at the first listening zone 106 and the bass content of the second signal $m_2$ constructively combines at the second listening zone 108 (i.e., using beamforming techniques, as are known in the art). While such filters are normally implemented as digital filters, these filters could alternatively be implemented as analog filters.

Further, rather than one set of filters, a plurality of filters can be implemented by controller 104 depending on the configuration of the vehicle cabin 100. For example, various parameters within the cabin will change the acoustics of the vehicle cabin 100, including, the number of passengers in the vehicle, whether the windows are rolled up or down, the position of the seats in the vehicle (e.g., whether the seats are upright or reclined or moved forward or back in the vehicle cabin), etc. These parameters can be detected by controller 104 (e.g., by receiving a signal from the vehicles on-board computer) and implement the correct set of filters to provide the first, second, and any additional arrayed configurations. Various sets of filters, for example, can be stored in memory (e.g., memory 130) and retrieved according to the detected cabin configuration.

In an alternative example, the filters can be a set of adaptive filters that are adjusted according to a signal received from an error microphone (e.g., disposed on binaural device or otherwise within a respective listening zone) in order to adjust the filter coefficients to align the first listening zone over a respective seating position (first seating position $P_1$ or second seating position $P_2$), or to adjust for changing cabin configurations, such as whether the windows are rolled up or down.

Given a substantially same magnitude of bass content in the first and second content signals, arraying of the perimeter speakers 102 means that the magnitude of the bass content of the first content signal $m_1$ is greater in the first listening zone 106 than the magnitude of the bass content of the second content signal $m_2$. Similarly, the magnitude of the bass content of the second content signal $m_2$ is greater than the magnitude of the bass content of the first content signal $m_1$. The net effect is that a user seated at position $P_1$ primarily perceives the bass content of the first content signal $m_1$ as greater than the bass content of the second content signal $m_2$, which may not be perceived at all in some instances. Similarly, a user seated at position $P_2$ primarily perceives the bass content of the second content signal $m_2$ as greater than the bass content of the first content signal $m_1$. In one example, the magnitude of the bass content of the first content signal $m_1$ is greater than the magnitude of the bass content of the second content signal $m_2$ by at least 3 dB in the first listening zone, and, likewise, the magnitude of the bass content of the second content signal $m_2$ is greater than the magnitude of the bass content of the first content signal $m_1$ by at least 3 dB in the second listening zone.

Although only four perimeter speakers 102 are shown, it should be understood that any number of perimeter speakers 102 greater than one can be used. Furthermore, for the purposes of this disclosure the perimeter speakers 102 can be disposed in or on the vehicle doors, pillars, ceiling, floor, dashboard, rear deck, trunk, under seats, integrated within seats, or center console in the cabin 100, or any other drive point in the structure of the cabin from which acoustic bass energy can be created in the cabin.

In various examples, the first content signal $m_1$ and second content signal $m_2$ (and any other received content signals) can be received from one or more of a mobile device (e.g., via a Bluetooth connection), a radio signal, a satellite radio signal, or a cellular signal, although other sources are contemplated. Furthermore, each content signal need not be received contemporaneously but rather can have been previously received and stored in memory for playback at a later time. Furthermore, as mentioned above, the first content signal $m_1$ and second content signal $m_2$ can be received as an analog or digital signal according to any suitable communications protocol. In addition, because the first content signal $m_1$ and second content signal $m_2$ can be transmitted digitally, which is comprised of a set of binary values, the bass content and upper range content of these signals refers to the constituent signals of the respective frequency ranges of the bass content, midrange content, and upper range content when the content signal is converted into an analog signal before being transduced by a speaker or other device.

Figure 1B:
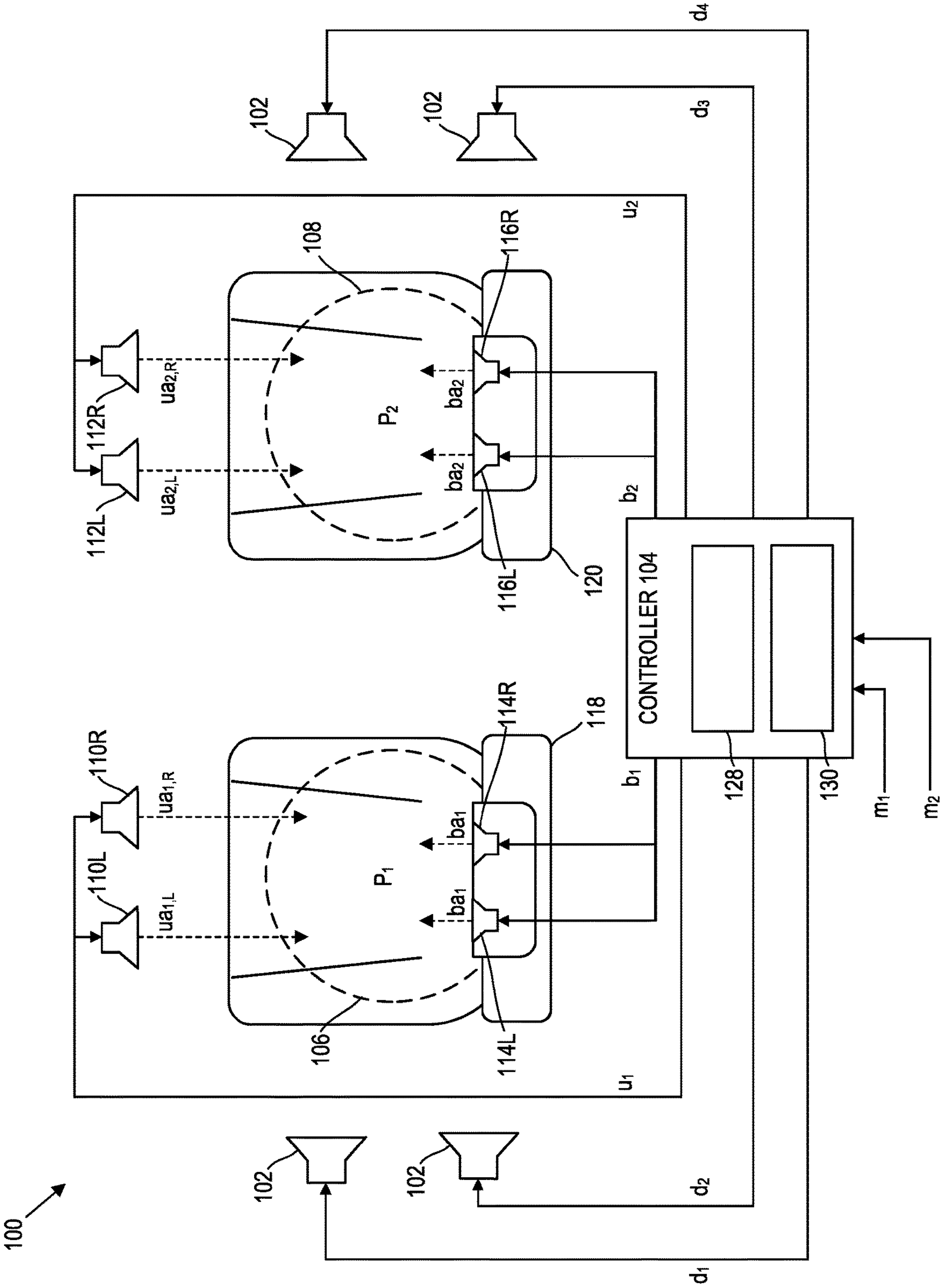
FIG. 1B depicts an audio system for providing augmented ultrasonic audio in a vehicle cabin, according to an example.

Turning to FIG. 1B, there is shown an alternative example, in which ultrasonic transducers 110, 112 are each included in a plurality of ultrasonic transducers, that together direct a binaural ultrasonic acoustic signals to the first listening zone 106 and second listening zone 108. More particularly, two ultrasonic transducers 110L and 110R together direct a binaural ultrasonic acoustic signal, comprising ultrasonic acoustic signals $ua_{1,L}$ and $ua_{1,R}$, to the first listening zone 106. A user seated in the first listening zone will receive $ua_{1,L}$ at the user's left ear and $ua_{1,R}$ at the user's right ear, with minimal to no audio leakage to the other ears, meaning that the user will perceive a demodulated ultrasonic signal as binaural (e.g., stereo).

In the same way, two ultrasonic transducers 112L and 112R together direct a binaural ultrasonic acoustic signal, comprising ultrasonic acoustic signals $ua_{2,L}$ and $ua_{2,R}$, to the first listening zone 106. A user seated in the second listening zone 108 will receive $ua_{2,L}$ at the user's left ear and $ua_{2,R}$ at the user's right ear, with minimal to no audio leakage to the other ears.

For the purposes of this disclosure, a binaural acoustic signal, ultrasonic or otherwise, is one that directs a different acoustic signal—and thus different acoustic energy—to each ear to create a binaural effect for the user. The binaural effect recreates the effect of wearing headphones, in which a separate acoustic signal is provided to each ear. The binaural acoustic signal can be, in one example, a stereo signal that provides a left channel acoustic signal to the user's left ear and a right channel acoustic signal to the user's right ear. Alternatively, or additionally, a spatialized acoustic signal can be provided by adjusting the relative phase and delay of the left acoustic energy and right acoustic energy. In general, a binaural acoustic effect does not demand complete isolation of the left acoustic energy and right acoustic energy. Indeed, it is expected that some degree of the left acoustic energy can be leaked to the user's right ear and some degree of right acoustic energy can be leaked to the user's left ear. As will be described in this disclosure, a binaural acoustic signal can be created in a variety of ways including through ultrasonic speakers, nearfield speakers disposed proximate to the user's ears, and through arraying of ultrasonic and/or nearfield speakers.

It should be understood that, although ultrasonic transducers 110L, 110R are shown receiving the same signal $u_1$, and ultrasonic transducers 112L, 112R are shown receiving the same signal $u_2$, in practice separate signals will be received from controller 104, as appropriate. For example, in the stereo example, signal $u_1$ can contain both left and right channels—this can be extended to the spatialized audio context by adjusting the phase and delay of the left and right channels to simulate the audio coming from a virtualized source, as will be described in more detail below. The number of channels included in each signal will depend upon the number of speakers, and thus signals $u_1$, $u_2$, $b_1$, $b_2$, etc., can include any number of channels as required.

Further, the left and right-side ultrasonic transducers can each be formed from a plurality of ultrasonic transducers driven in an array configuration to steer the left and right ultrasonic beams. For example, the left-side ultrasonic transducer 110L can comprise a plurality of ultrasonic transducers, arrayed to steer the beam toward the left ear of a user seated in the first listening zone 106 (and direct nulls toward the right ear). Likewise, the ultrasonic transducer 110R can comprise a plurality of ultrasonic transducers arrayed to steer a beam toward the right ear of a user seated in the first listening zone 106 (and direct nulls toward the left ear). In the same way, each of the ultrasonic transducers 112L, 112R can comprise multiple speakers be arrayed to steer beams to toward the left and right ears, respectively, of a user seated in the second listening zone 108. Given the available high directivity of ultrasonic transducers normally present, such steering is not always necessary. Indeed, in most examples, an ultrasonic acoustic signal directed toward the one side of the headrest will be sufficiently direct to be perceived by only the ear on that side. However, particularly in a spatialized audio context, such steering with arrayed ultrasonic transducers is contemplated to accurately track the location the user's ear, or to narrow the beam further, if desired, to improve the audio isolation of the left and right ultrasonic acoustic signals.

Continuing in FIG. 1B, midrange speakers 114, 116 are each included in a plurality of midrange speakers that together direct a binaural midrange to the first listening zone 106 and second listening zone 108. Specifically, two midrange speakers 114L,114R (i.e., left and right sides) together direct a binaural midrange acoustic signal, comprising midrange acoustic signals left-side binaural midrange acoustic signal $ba_{1,L}$ and right-side binaural midrange acoustic signal $ba_{1,R}$, to the first listening zone 106. A user seated in the first listening zone 106 will receive left-side binaural midrange acoustic signal $ba_{1,L}$ at the user's left ear and right-side binaural midrange acoustic signal $ba_{1,R}$ at the user's right ear. Similarly, two midrange speakers 116L, 116R together direct a binaural midrange acoustic signal, comprising left-side binaural midrange acoustic signal $ba_{2,L}$ and right-side binaural midrange acoustic signal $ba_{2,R}$, to the second listening zone 108. A user seated in the second listening zone 108 will receive left-side binaural midrange acoustic signal $ba_{2,L}$ at the user's left ear and right-side binaural midrange acoustic signal $ba_{2,R}$ at the user's right ear.

As described above, the midrange speakers can each be near-field speakers, which, depending on how close these are to the user's ears, reduce the amount of sound leakage between ears (i.e., the degree to which the left-side midrange speaker leaks to the right ear and vice versa) by virtue of the smaller driver and proximity to the user's ears. However, to further reduce leakage, each the left and right sides can comprise multiple speakers driven an array configuration by controller 104 to steer the left and right binaural midrange acoustic signals. Thus, the left-side midrange speaker 114L can comprise a plurality of midrange speakers, arrayed to steer the beam toward the left ear of a user seated in the first listening zone 106 (and direct nulls toward the right ear). Likewise, the right-side midrange speaker 114R can comprise a plurality of midrange speakers arrayed to steer a beam toward the right ear of a user seated in the first listening zone 106 (and direct nulls toward the left ear). This can be achieved with a set of interaural cross-cancellation filters, employed by controller 104.

A user seated at seating position $P_1$ thus perceives the first content signal $m_1$ played in the first listening zone 106 from the combined outputs of the first arrayed configuration of perimeter speakers 102, the ultrasonic transducers 110L, 110R, and (in certain examples) midrange speakers 114L, 114R. Likewise, the user seated at seating position $P_2$ perceives the second content signal $m_2$ played in the second listening zone 108 from the combined outputs of the second arrayed configuration of perimeter speakers 102 and the ultrasonic transducers 112L, 112R, and (in certain examples) midrange speakers 116L, 116R.

Alternatively, ultrasonic transducers 110, 112, midrange speakers 114, 116, and perimeter speakers can deliver to both users the same content. In this example, controller 104 can augment the acoustic signal produced by the ultrasonic transducers 110, 112 and midrange speakers 114, 116 with bass content produced by perimeter speakers 102 without creating separate listening zones for playing separate content. Although each device receives the same program content signal, it is conceivable that the user would select different volume levels of the same content. In this case, rather than creating separate listening zones, controller 104 can employ the first array configuration and second array configuration of perimeter speakers 102 to create separate volume zones, in which each user perceives the same program content at different volumes. Ultrasonic transducers 110, 112 and midrange speakers 114, 116 can likewise provide the same content at different volumes in the different listening zones 106, 108.

Figure 1C:
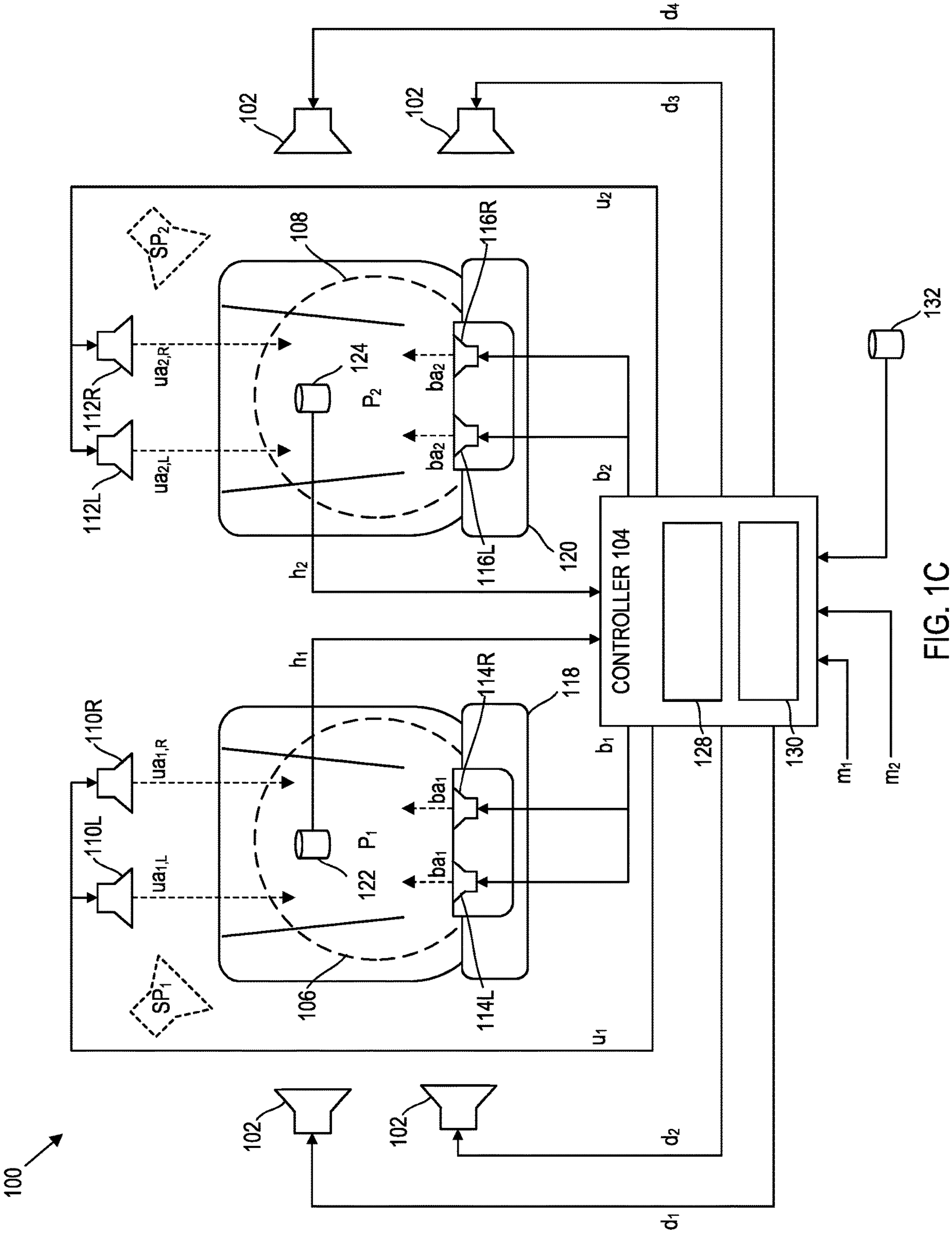
FIG. 1C depicts an audio system for providing augmented ultrasonic audio in a vehicle cabin, according to an example.

In addition, although only two listening zones 106 and 108 are shown in FIGS. 1A-1C it should be understood that controller 104 can receive any number of content signals and create any number of listening zones (including only one) by filtering the content signals to array perimeter speakers, each listening zone receiving the bass content of a unique content signal. For example, in a five-seat car, the perimeter speakers can be arrayed to produce five separate listening zones, each producing the bass content of a unique content signal. Furthermore, ultrasonic speakers and/or midrange speakers can be associated with each listening zone. Thus, if there are five listening zones, one or more ultrasonic speakers and one or more midrange speakers can be associated with each.

Turning to FIG. 1C, there is shown an alternative example, in which controller 104 is further configured to provide a spatialized output (binaural signals $u_1$, $u_2$) via ultrasonic transducers 110, 112 such that a user seated within the first listening zone 106 or the second listening zone 108 perceives the audio as originating from a virtual sound source. For example, the binaural output (ultrasonic acoustic signals $ua_{1,L}$, $ua_{1,R}$) of ultrasonic transducers 110L, 110R can be spatialized such that a user seated in first listening zone 106 perceives the demodulated sound as originating from virtual source $SP_1$, distinct from the locations of ultrasonic transducers 110L, 110R and also distinct from the location of the user's ear, where the demodulated ultrasonic sound is typically perceived. Likewise, the binaural output (ultrasonic acoustic signals $ua_{2,L}$, $ua_{2,R}$) of ultrasonic transducers 112L, 112R can be spatialized such that a user seated in the second listening zone 108 perceives the demodulated sound as originating from virtual source $SP_2$. Virtual locations $SP_1$ and $SP_2$ can be the same or different.

Additionally, the midrange speakers 114L, 114R and 116L, 116R can produce, according to the output of controller 104, spatialized binaural outputs such that a user perceives the audio originating from a virtualized source. For example, the binaural output (midrange acoustic signals $ba_{1,L}$, $ba_{1,R}$) of midrange speakers 114L, 114R can be spatialized such that a user seated in first listening zone 106 perceives the midrange sound as originating from virtual source $SP_1$, and the binaural output (midrange acoustic signals $ba_{2,L}$, $ba_{2,R}$) of midrange speakers 116L, 116R can be spatialized such that a user seated in second listening zone 108 perceives the midrange sound as originating from virtual source $SP_2$. Stated differently, the spatialized audio generated by the ultrasonic transducers can be augmented by the spatialized audio generated by the midrange speakers, such that the user perceives the collective output of the ultrasonic transducers and midrange speakers as originating from a virtual source distinct from the location of either and distinct from the location of the user's ear. Of course, as described above, the outputs of the perimeter speakers 102 can augment the spatialized sound of both the ultrasonic speakers 110, 112 and the midrange speakers 114, 116.

It is not, however, strictly necessary for the outputs of both the ultrasonic speakers and the midrange speakers to be spatialized. In some examples, the output of midrange speakers can be spatialized, while the higher frequency output of the ultrasonic transducers can be non-spatialized (e.g., a typical mono or stereo sound). In this example, the primary spatialized effect is brought about by the midrange speakers, while the ultrasonic speakers function to provide additional high frequency color or equalization to audio. In other examples, the midrange speakers can be omitted, and the ultrasonics transducers used to provide both the mid-range and the upper range content. In this example, some or all of the frequency bands can be spatialized. For example, the midrange content can be spatialized while the high frequency content can be non-spatialized. This will still provide a spatialized effect for the listener, in much the same way that the spatialized from the midrange speakers can provide a spatialized effect, even if the upper range content from the ultrasonic speakers remains non-spatialized.

The production of spatialized audio signals is generally understood in the art, so a detailed explanation will be omitted here. Generally, however, some amount of head-tracking, i.e., tracking the position of the user's head relative to the vehicle cabin, is required to accurately render the spatialized audio. More particularly, the spatialized binaural signal in listening zone 106 is produced by tracking the relative position of the head of the user seated at seating position $P_1$, and the spatialized binaural signal in listening zone 108 is produced by the tracking the relative position of the head of the user seated at seating position $P_2$. To track the relative positions of the user's heads, a headtracking device 122, 124 can be associated with each seating position.

In various examples, the first headtracking device 122 and second headtracking device 124 can be comprised of a time-of-flight sensor configured to detect the position of a user's head within the vehicle cabin 100. However, a time-of-flight sensor is only possible example. Alternatively, multiple 2D cameras that triangulate on the distance from one of the camera focal points using epi-polar geometry, such as the eight-point algorithm, can be used. Alternatively, each headtracking device can comprise a LIDAR device, which produces an image with ranging data for each pixel as one data set. In alternative examples, where each user is wearing a wearable, the headtracking can be accomplished, or may be augmented, by tracking the respective position of the wearable on the user, as this will typically correlate to the position of the user's head. In still other alternative examples, capacitive sensing, inductive sensing, inertial measurement unit tracking in combination with imaging, can be used. In an example, the headtracking output can be compared against the output of a device tracking the orientation of the vehicle, such as inertial measurement unit 132, the difference between the two indicating the relative movement of the user's head compared to the vehicle. An example of this is described in U.S. provisional application 63/366,294 and titled "Systems and Methods for Providing Augmented Audio," incorporated by reference in its entirety. It should be understood that the above-mentioned implementations of headtracking device are meant to convey that a range of possible devices and combinations of devices might be used to track the location of a user's head.

For the purposes of this disclosure, detecting the position of a user's head can comprise detecting any part of the user, or of a wearable worn by the user, from which the position of the center of user's cranium can be derived. For example, the location of the user's ears can be detected, from which a line can be drawn between the tragi to find the middle in approximation of the finding the center. Detecting the position of the user's head can comprise detecting the orientation of the user's head, which can be derived according to any method for finding the pitch, yaw, and roll angles. Of these, the yaw is particularly important as it typically affects the ear distance to each speaker the most.

First headtracking device 122 and second headtracking device 124 can be in communication with a controller 104 which receives the respective outputs $h_1$, $h_2$ of first headtracking device 122 and second headtracking device 124 and determines from them the position of the user's head seated at position $P_1$ or position $P_2$ and generates an output signal to controller 104 accordingly. For example, headtracking controller 104 can receive output data $h_1$ from first headtracking device 122, interpret the position of the head of a user seated at position $P_1$. Likewise, controller 104 can receive output data $h_2$ from second headtracking device 124 and interpret the position of the head of a user seated at seating position $P_2$.

With the position of the user's head input to controller 104, the spatialized audio signals can be implemented by filtering and/or attenuating the binaural audio signals ($u_1$, $u_2$ and/or $b_1$, $b_2$) according to a plurality of head-related transfer functions (HRTFs), which adjust acoustic signals to simulate sound from the virtual spatial point (e.g., $SP_1$, $SP_2$). As the signals are binaural, i.e., relate to both of the listener's ears, the system can utilize one or more HRTFs to simulate sound specific to various locations around the listener. It should be appreciated that the particular left and right HRTFs used by the controller 504 can be chosen based on a given combination of azimuth angle and elevation detected between the relative position of the user's left and right ears and the respective spatial position $SP_1$, $SP_2$. More specifically, a plurality of HRTFs can be stored in memory and be retrieved and implemented according to the detected position of the user's left and right ears and selected spatial position $SP_1$, $SP_2$.

Although two different spatial points $SP_1$, $SP_2$ are shown in FIG. 1C, it should be understood that the same spatial point can be used for both listening zones 106, 108. Furthermore, for a given listening zone, any point in space can be selected as the spatial point from which to virtualize the generated acoustic signals. (The selected point in space can be a moving point in space, e.g., to simulate an audio-generating object in motion.) For example, left, right, or center channel audio signals can be simulated as though they were generated at a location proximate the perimeter speakers 102. Furthermore, the realism of the simulated sound may be enhanced by adding additional virtual sound sources at positions within the environment, i.e., vehicle cabin 100, to simulate the effects of sound generated at the virtual sound source location being reflected off acoustically reflective surfaces and back to the listener. Specifically, for every virtual sound source generated within the environment, additional virtual sound sources can be generated and placed at various positions to simulate a first order and a second order reflection of sound corresponding to sound propagating from the first virtual sound source and acoustically reflecting off of a surface and propagating back to the listener's ears (first order reflection), and sound propagating from the first virtual sound source and acoustically reflecting off a first surface and a second surface and propagating back to the listener's ears (second order reflection). Methods of implementing HRTFs and virtual reflections to create spatialized audio are discussed in greater detail in U.S. Pat. No. 11,617,050 titled "Systems and methods for sound source virtualization," the entirety of which is incorporated by reference herein. In an example, the virtual sound source can be located outside the vehicle. Likewise, the first order reflections and second order reflections need not be calculated for the actual surfaces within the vehicle, but rather than can be calculated for virtual surfaces outside the vehicle, to for example, create the impression that the user is in a larger area than the cabin, or at least to optimize the reverb and quality of the sound for an environment that is better than the cabin of the vehicle.

As shown in FIGS. 1A-1C, controller 108 can comprise a processor 122 (e.g., a digital signal processor) and a non-transitory storage medium 124 storing program code that, when executed by processor 122, carries out the various functions and methods described in this disclosure. Processor 122 and memory 124 thus, among other functions, can receive content signals $m_1$ and $m_2$, filter them into a lower range, a midrange, and an upper range, and provide them to ultrasonic transducers 110, 112, midrange speakers 114, 116, and perimeter speakers 102. Further, processor 122 and memory 124 can further operate together to filter the signals provided to the speakers to suitably array perimeter speakers 102 to create the different bass zones or to array ultrasonic transducers 110, 112, and/or midrange speakers 114, 116 (as appropriate in various examples)/Controller 108 can further create the binaural or spatial signals to be provided to the ultrasonic transducers 110, 112 and/or midrange speakers 114, 116. In various examples, controller 104 can comprise more than one processor and/or more than one memory to perform such function or additional functions. For example, one processor and memory can receive the output of head-tracking devices 122, 124, and provide a position signal, representing the detected head position, to a separate processor and memory, which can adjust the filters necessary to provide the spatial binaural audio signal to ultrasonic transducers 110, 112 and/or to midrange speakers 114, 116.

Furthermore, in certain examples, controller 108 can comprise circuitry for receiving and filtering content signals $m_1$ and $m_2$ and provide them to ultrasonic transducers 110, 112, midrange speakers 114, 116, and perimeter speakers 102. Indeed, circuitry for filtering signals is well known, and so a detailed description is omitted herein; any suitable filtering circuitry can be used.

Controller 104 can further comprise any associated hardware or firmware for preparing the output signals to drive ultrasonic transducers 110, 112, midrange speakers 114, 116, and perimeter speakers 102. In general, it should be understood that in certain instances, hardware (circuits, integrated or otherwise) is appropriate for carrying out certain functions and can be utilized in place of software or firmware. For the purposes of this disclosure, references to the controller driving the speakers or preparing a drive signal for the speakers should not be understood to necessarily exclude intermediate circuitry or processing existing between controller 108 and speakers within the cabin (e.g., perimeter speakers 102 and nearfield speakers 104, 106). For example, as described above in connection with FIG. 2, controller 104 can provide signals to hardware for heterodyning the upper range and/or midrange signal with the ultrasonic carrier frequency. Additionally, other intermediate hardware/software, such as an upmixer, which receives for example, left and right program content signals and generates left, right, center, etc. channels within the vehicle, is conceivable. The spatialized audio, rendered by ultrasonic transducers 110, 112 and/or to midrange speakers 114, 116 can be leveraged to enhance the user's perception of the source of these channels. Thus, in effect, multiple virtual sound sources can be selected to accurately create impressions of left, right, center, etc., audio channels.

Figure 3A:
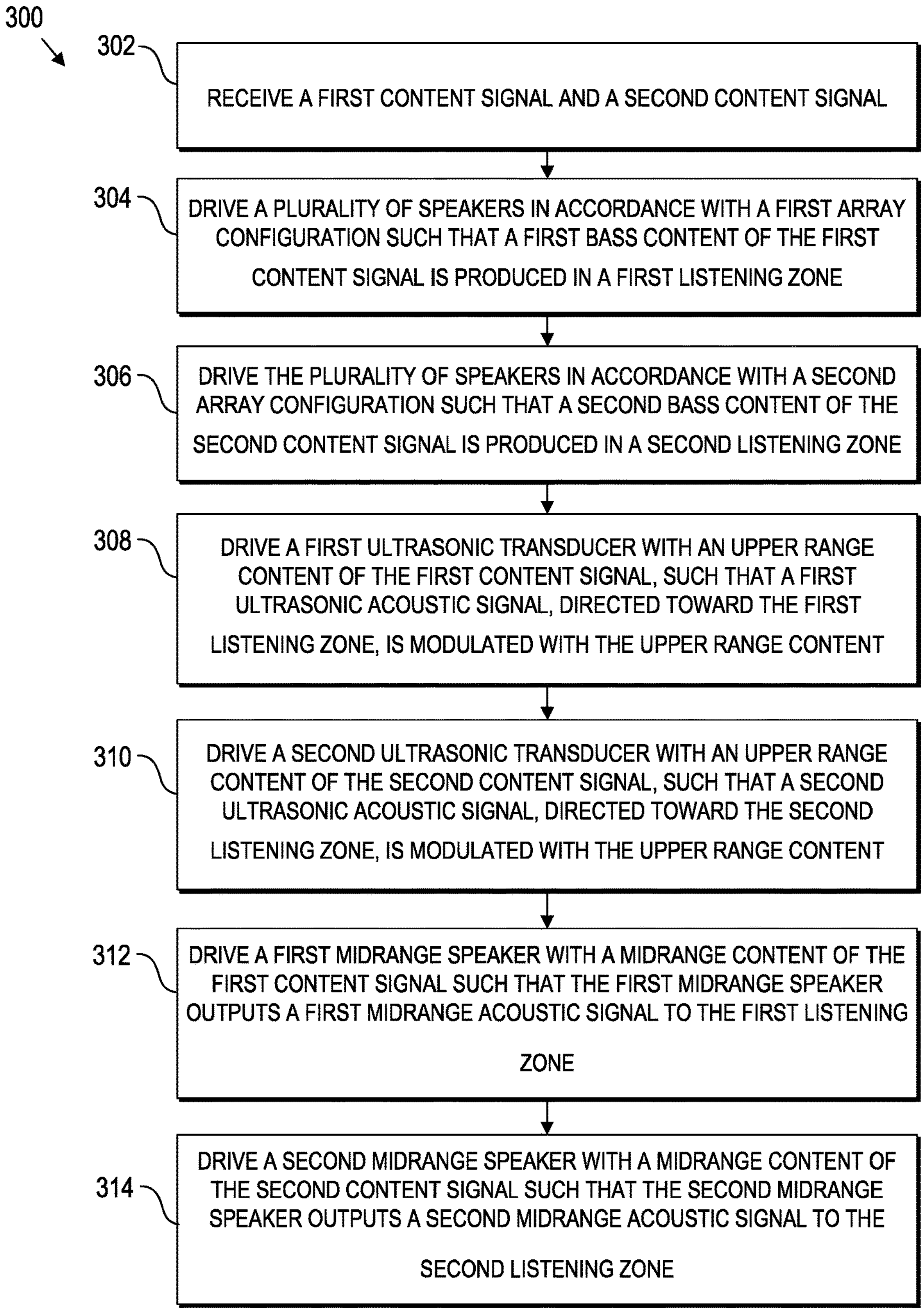
FIG. 3A depicts a method for providing augmented ultrasonic audio in a vehicle cabin, according to an example.
Figure 3B:
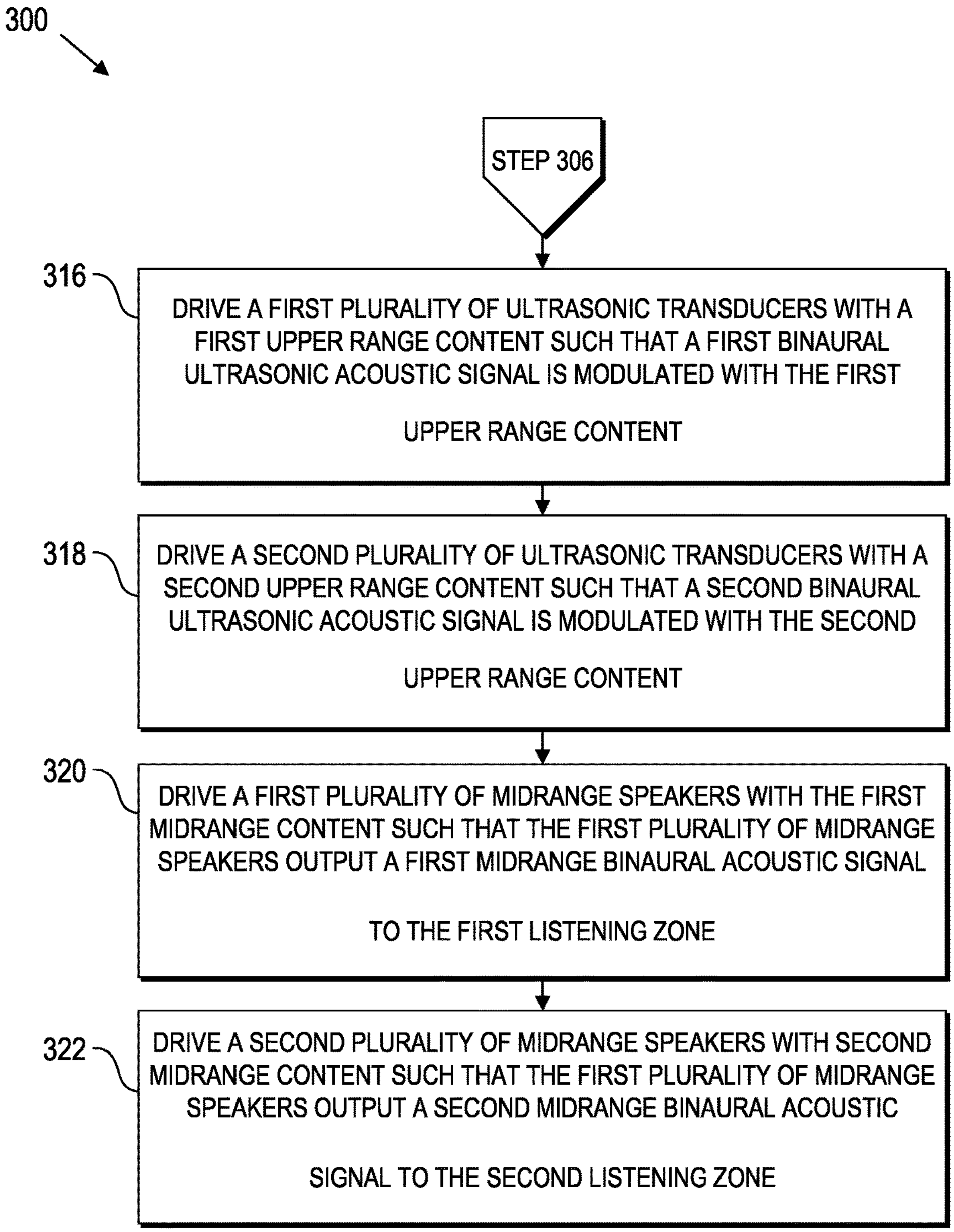
FIG. 3B depicts a part of a method for providing augmented ultrasonic audio in a vehicle cabin, according to an example.

FIG. 3 depicts a flowchart for a method 300 of providing augmented audio to users in a vehicle cabin. The steps of method 300 can be carried out by a controller (such as controller 104) in communication with a set of perimeter speakers (such as perimeter speakers 102) disposed in a vehicle and further in communication with, at least, two ultrasonic transducers (such ultrasonic transducers 110, 112) further disposed in the vehicle cabin. In certain examples, the steps of method 300 are steps of program stored in a non-transitory storage medium and executed by a processor of the controller.

At step 302 a first content signal and second content signal are received. These content signals can be received from multiple potential sources such as mobile devices, radio, satellite radio, a cellular connection, etc. The content signals each represent audio that may include a bass content, a midrange content, and an upper range content.

At steps 304 and 306 a plurality of perimeter speakers are driven in accordance with a first array configuration (step 404) and a second array configuration (step 406) such that the bass content of the first content signal is produced in a first listening zone and the bass content of the second content signal is produced in a second listening zone in the cabin. The nature of the arraying produces listening zones such that, when the bass content of the first content signal is played in the first listening zone at the same magnitude as the bass content of the second signal is played in the second listening zone, the magnitude of the bass content of the first content signal will be greater than the magnitude of the bass content of the second content signal (e.g., by at least 3 dB) in the first listening zone, and the magnitude of the bass content of the second signal will be greater than the magnitude of the bass content of the first content signal (e.g., by at least 3 dB) in the second listening zone. In this way, a user seated at the first seating position will perceive the magnitude of the first bass content as greater than the second bass content. Likewise, a user seated at the second seating position will perceive the magnitude of the second bass content as greater than the first bass content.

At step 308, the first ultrasonic transducer is driven with the upper range content (and, in some examples, the midrange content) of the first content signal, such that a first ultrasonic acoustic signal, directed toward the first listening zone, is modulated with the upper range content. Driving the first ultrasonic transducer can comprise heterodyning the upper range content with an ultrasonic carrier frequency, the modulated output of which being directed toward the ultrasonic transducer. Although, in other examples, the modulated ultrasonic signal can be directly output from a processor of the controller. Because ultrasonic acoustic signals are demodulated through the non-linearities inherent in the propagation of acoustic signals through the air, a user in the first listening zone perceives upper range (and midrange, in certain examples) at the user's ear.

Likewise, at step 310, the second ultrasonic transducer is driven with the upper range content (and, in some examples, the midrange content) of the second content signal, such that a second ultrasonic acoustic signal, directed toward the second listening zone, is modulated with the upper range content. Driving the first ultrasonic transducer can comprise heterodyning the upper range content with an ultrasonic carrier frequency (i.e., outputting the upper range to a mixer that also receives the carrier frequency), the modulated output of which being directed toward the ultrasonic transducer. However, in other examples, the modulated ultrasonic signal can be directly output from a processor of the controller. Because each ultrasonic speaker can be highly directive, there is minimal leakage between listening zones, and each user hears only the upper frequency (and midrange in some examples) from the ultrasonic speaker directed toward the user.

In certain examples, instead of a single ultrasonic transducer, multiple ultrasonic transducers can be arrayed to steer an ultrasonic beam toward the first or second listening zones. This can be used to enhance to enhance the directivity of each ultrasonic acoustic signal and to further minimize leakage between the zones. Arraying can also be used, in conjunction with headtracking, to direct the ultrasonic acoustic signal to the user, rather than to a space that the user is only likely occupying (e.g., a seat in the vehicle).

As mentioned in steps 308 and 310, in certain examples, only the upper range content of the first and second content signals is modulated with the ultrasonic carrier frequency and output from the ultrasonic transducer. In these examples, the midrange content can be output from midrange speakers disposed in each seat, such as in the headrest or seatback (e.g., disposed around the user's shoulders).

More particularly, at steps 312 and 314, a first midrange speaker is driven with the midrange content of the first content signal such that the first midrange speaker directs a first midrange acoustic signal to the first listening zone (step 312), and a second midrange speaker is driven with the midrange content of the second content signal such that the second midrange speaker directs a second midrange acoustic signal to the second listening zone (step 314). The result is that the user perceives the bass response from the perimeter speakers, the midrange content from the midrange speakers, and the upper frequency content from the ultrasonic transducers. By employing midrange speakers, the spectral content delivered to the user via the ultrasonic transducers can be reduced, improving the experience for users that perceive negative effects from ultrasonic signals. The first midrange speaker and the second midrange speaker can be disposed in respective seats of the vehicle cabin, such as within the headrest or the seatback (e.g., near the user's shoulders).

Like the ultrasonic transducer, rather than a single midrange speaker, the first midrange speaker and the second midrange speaker can each be comprised of multiple speakers, arrayed to steer the beam toward the user and away from the remaining listening zones, improving the inter-seat isolation of the midrange speakers.

Rather than directing a mono upper range acoustic signal and a mono midrange acoustic signal to the user in each listening zone, binaural upper range and midrange acoustic signals can be provided. This can be accomplished by driving a plurality of ultrasonic transducers to deliver a binaural ultrasonic acoustic signal to each listening zone, and, likewise, in certain examples, driving a plurality of midrange speakers to deliver a binaural signal to each listening zone.

Specifically, at step 316, a first plurality of ultrasonic transducers can be driven with the first upper range content so that a first binaural ultrasonic acoustic signal is modulated with the first upper range content, the first binaural ultrasonic acoustic signal being directed toward the first listening zone. The first plurality of ultrasonic transducers can include at least one left-side ultrasonic transducer directing a left-side ultrasonic signal to the user's left ear and at least one right-side ultrasonic transducer directing a right-side ultrasonic signal to the user's right ear. In certain examples, multiple left-side ultrasonic transducers can be arrayed to steer an ultrasonic beam toward the user's left ear and the multiple right-side ultrasonic transducers can be arrayed to steer an ultrasonic beam toward the user's right ear. In the same way, at step 318, a second plurality of ultrasonic transducers can be driven with the second upper range content so that a second binaural ultrasonic acoustic signal is modulated with the second upper range content, the second binaural ultrasonic acoustic signal being directed toward the second listening zone. This can be considered a binaural extension of the mono examples of step 308 and 310 (e.g., subsuming the first and second ultrasonic transducers into the first and second pluralities of ultrasonic transducers, respectively.)

Further, the left and right binaural acoustic signals delivered to each listening zone can be filtered to deliver a spatialized audio signal to the user, such that the user in each listening zone perceives the acoustic signal as originating from a virtual source. For example, the left and right binaural ultrasonic acoustic signals of the first plurality of ultrasonic transducers can be spatialized such that a user in the first listening zone perceives the demodulated upper range (and midrange content) as originating from a virtual source. The left and right binaural ultrasonic acoustic signals of the second plurality of ultrasonic transducers can be spatialized such that a user in the second listening zone perceives the demodulated upper range (and midrange content) as originating from a virtual source. This can be accomplished according to known methods of producing spatialized content and can be based on the position of a user's head according to a headtracking device, such as a plurality of two-dimensional cameras, a time-of-flight sensor, and at least one inertial measurement unit.

In much the same way, at steps 320 and 322, a first plurality of midrange speakers is driven with the first midrange content to output a first binaural midrange acoustic signal to the first listening zone (step 320) and a second plurality of midrange speakers is driven with the second midrange content to output a second binaural midrange acoustic signal to the second listening zone (step 322). For example, the first plurality of midrange speakers can include at least one left-side midrange speaker directing a left-side midrange acoustic signal to the user's left ear and at least one right-side midrange speaker directing a right-side midrange acoustic signal to the user's right ear. Likewise, the second plurality of midrange speakers can include left and right midrange speakers delivering left and right midrange acoustic signals to the user in the second listening zone. In certain examples, each plurality of midrange speakers can multiple left-side ultrasonic transducers can be arrayed to steer an ultrasonic beam toward the user's left ear and the multiple right-side ultrasonic transducers can be arrayed to steer an ultrasonic beam toward the user's right ear.

Further, the binaural acoustic signals from the midrange speakers can be spatialized to augment the ultrasonic acoustic signal produced by the first and second plurality of ultrasonic transducers. Thus, the first binaural midrange acoustic signal can be spatialized so that a user in the first listening zone perceives the sound as originating the first virtual source location, and the second binaural midrange acoustic signal can be spatialized so that a user in the second listening zone perceives the sound as originated from the second virtual source location.

It should further be understood that, to the extent the acoustic signals are spatialized, any number of virtual sources can be created. Indeed, multiple virtual sources can be used to create the effect of a left, center, right and virtual audio channel or a larger soundstage.

Additionally, although method 300 is described for two separate listening zones, it should be understood that method 300 can be extended to any number of listening zones (including only one). In cases of more listening zones, ultrasonic transducers and, in certain examples, midrange speakers, can be dedicated to each listening zone, as appropriate.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. A system for providing augmented ultrasonic audio in a vehicle, comprising:

a plurality of speakers disposed in a perimeter of a cabin of the vehicle;

a first ultrasonic transducer arranged to direct a first ultrasonic acoustic signal to a first listening zone within a cabin of the vehicle, wherein the first listening zone is disposed at a first seating location;

a second ultrasonic transducer arranged within the cabin to direct a second ultrasonic acoustic signal to a second listening zone within the cabin, wherein the first listening zone is disposed at a second seating location;

a first midrange speaker arranged to direct a first midrange acoustic signal to the first listening zone, wherein the first midrange speaker is a near-field speaker;

a second midrange speaker arranged to direct a second midrange acoustic signal to the second listening zone, wherein the second midrange speaker is a near-field speaker, and a controller configured to drive the plurality of speakers in accordance with a first array configuration such that a first bass content of a first content signal is produced in the first listening zone, and to drive the plurality of speakers in accordance with a second array configuration such that a second bass content of a second content signal is produced in the second listening zone, wherein in the first listening zone a magnitude of the first bass content is greater than a magnitude of the second bass content and in the second listening zone the magnitude of the second bass content is greater than the magnitude of the first bass content, wherein the controller is further configured to drive the first ultrasonic transducer with a first upper range content of a first content signal such that the first ultrasonic acoustic signal is modulated with the first upper range content, and to drive the second ultrasonic transducer with a second upper range content of the second content signal such that the second ultrasonic acoustic signal is modulated with the second upper range content, and to drive the first midrange speaker with a first midrange content of the first content signal such that the first midrange acoustic signal includes the first midrange content, wherein the first midrange content is disposed, spectrally, between the first bass content and the first upper range content, wherein the controller is further configured to drive the second midrange speaker with a second midrange content of the second content signal such that the second midrange acoustic signal includes a midrange content of the second content signal, wherein the second midrange content is disposed, spectrally, between the second bass content and the second upper range content.

2. The system of claim 1, wherein the first ultrasonic transducer is one of a first plurality of ultrasonic transducers together directing a first binaural ultrasonic acoustic signal to the first listening zone, wherein the controller is further configured to drive the first plurality of ultrasonic transducers with the first upper range content such that the first binaural ultrasonic acoustic signal is modulated with the first upper range content.

3. The system of claim 1, wherein driving the first ultrasonic transducer with a first upper range content comprises heterodyning a first ultrasonic signal with the first upper range content.

4. The system of claim 1, wherein the first midrange speaker is disposed within at least one of a headrest, a seatback, or a headliner of the cabin.

5. The system of claim 1, wherein the first midrange speaker is one of a first plurality of midrange speakers together directing a first binaural midrange acoustic signal to the first listening zone, wherein the controller is configured to drive the first plurality of midrange speakers with the first midrange content of the first content signal.

6. The system of claim 5, wherein the controller is configured to drive the first plurality of midrange speakers in an array configuration to produce the first binaural midrange acoustic signal in the first listening zone.

7. The system of claim 5, wherein the controller is configured to drive the first plurality of midrange speakers such that the first binaural midrange acoustic signal is perceived by a first user in the first listening zone as originating from a first virtual source location within the vehicle cabin.

8. The system of claim 5, wherein the first ultrasonic transducer is one of a first plurality of ultrasonic transducers together directing a first binaural ultrasonic acoustic signal to the first listening zone, wherein the controller is further configured to drive the first plurality of ultrasonic transducers with the first upper range content such that the first binaural ultrasonic acoustic signal is modulated with the first upper range content.

9. At least one non-transitory storage medium storing program code, the program code, when executed by a processor, producing augmented ultrasonic audio in a vehicle, the program code comprising:

driving a first ultrasonic transducer with a first upper range content of a first content signal such that a first ultrasonic acoustic signal, output by the first ultrasonic transducer, is modulated with the first upper range content, wherein the first ultrasonic transducer is arranged to direct the first ultrasonic acoustic signal to the first listening zone within a cabin of the vehicle, wherein the first listening zone is disposed at a first seating location;

driving a second ultrasonic transducer with a second upper range content of a second content signal such that a second ultrasonic acoustic signal is modulated with the second upper range content, wherein the second ultrasonic transducer is arranged to direct the second ultrasonic acoustic signal to the second listening zone within the cabin, wherein the second listening zone is disposed at a second seating location, driving a plurality of speakers disposed in a perimeter of the cabin in accordance with a first array configuration such that a first bass content of the first content signal is produced in the first listening zone, and in accordance with a second array configuration such that a second bass content of the second content signal is produced in the second listening zone, wherein in the first listening zone a magnitude of the first bass content is greater than a magnitude of the second bass content and in the second listening zone the magnitude of the second bass content is greater than the magnitude of the first bass content;

driving a first midrange speaker with a first midrange content of the first content signal such that a first midrange acoustic signal, output by the first midrange speaker, includes the first midrange content, the first midrange speaker arranged to direct the first midrange acoustic signal to the first listening zone, wherein the first midrange speaker is a near-field speaker, wherein the first midrange content is disposed, spectrally, between the first bass content and the first upper range content, and driving a second midrange speaker with a second midrange content of the second content signal such that a second midrange acoustic signal, output by the second midrange speaker, includes the second midrange content, the second midrange speaker arranged to direct the second midrange acoustic signal to the second listening zone, wherein the second midrange speaker is a near-field speaker, wherein the second midrange content is disposed, spectrally, between the second bass content and the second upper range content.

10. The at least one non-transitory storage medium of claim 9, further comprising:

driving a first plurality of ultrasonic transducers with the first upper range content such that a first binaural ultrasonic acoustic signal, output by the first plurality of ultrasonic transducers, is modulated with the first upper range content, wherein the first ultrasonic transducer is one of the first plurality of ultrasonic transducers.

11. The at least one non-transitory storage medium of claim 9, wherein driving the first ultrasonic transducer with a first upper range content comprises providing the first upper range content to a mixer to heterodyne a first ultrasonic signal with the first upper range content.

12. The at least one non-transitory storage medium of claim 9, wherein the first midrange speaker is disposed within at least one of a headrest, a seatback, or a headliner of the cabin.

13. The at least one non-transitory storage medium of claim 9, further comprising:

driving a first plurality of midrange speakers with the first midrange content such that a first binaural midrange acoustic signal, output by the first plurality of midrange speakers, includes the first midrange content, wherein the first midrange speaker is one of a first plurality of midrange speakers.

14. The at least one non-transitory storage medium of claim 13, wherein driving the first plurality of midrange speakers comprises driving the first plurality of midrange speakers in an array configuration to produce the first binaural midrange acoustic signal in the first listening zone.

15. The at least one non-transitory storage medium of claim 13, wherein driving the first plurality of midrange speakers comprises driving the first plurality of midrange speakers such that the first binaural acoustic signal is perceived by a first user in the first listening zone as originating from a first virtual source location within the vehicle cabin.

16. The at least one non-transitory storage medium of claim 13, further comprising:

driving a first plurality of ultrasonic transducers with the first upper range content such that a first binaural ultrasonic acoustic signal, output by the first plurality of ultrasonic transducers, is modulated with the first upper range content, wherein the first ultrasonic transducer is one of the first plurality of ultrasonic transducers.

17. A system for providing augmented ultrasonic audio in a vehicle, comprising:

a plurality of speakers disposed in a perimeter of a cabin of the vehicle;

a first ultrasonic transducer arranged within the cabin to direct a first ultrasonic acoustic signal to a first listening zone with the cabin, wherein the first listening zone is disposed at a first seating location;

a second ultrasonic transducer arranged within the cabin to direct a second ultrasonic acoustic signal to a second listening zone within the cabin, wherein the first listening zone is disposed at a second seating location; and a controller configured to drive the plurality of speakers in accordance with a first array configuration such that a first bass content of a first content signal is produced in the first listening zone, and to drive the plurality of speakers in accordance with a second array configuration such that a second bass content of a second content signal is produced in the second listening zone, wherein in the first listening zone a magnitude of the first bass content is greater than a magnitude of the second bass content and in the second listening zone the magnitude of the second bass content is greater than the magnitude of the first bass content, wherein the controller is further configured to drive the first ultrasonic transducer with a first upper range content of the first content signal such that the first ultrasonic acoustic signal is modulated with the first upper range content, and to drive the second ultrasonic transducer with a second upper range content of the second content signal such that the second ultrasonic acoustic signal is modulated with the second upper range content, wherein the first ultrasonic transducer is one of a first plurality of ultrasonic transducers together directing a first binaural ultrasonic acoustic signal to the first listening zone, wherein the controller is further configured to drive the first plurality of ultrasonic transducers with the first upper range content such that the first binaural ultrasonic acoustic signal is modulated with the first upper range content, the first binaural ultrasonic acoustic signal being perceived by a first user within the first listening zone as originating from a first virtual source location within the vehicle cabin, wherein the second ultrasonic transducer is one of a second plurality of ultrasonic transducers together directing a second binaural ultrasonic acoustic signal to the second listening zone, wherein the controller is further configured to drive the second plurality of ultrasonic transducers with the second upper range content such that the second binaural ultrasonic acoustic signal is modulated with the second upper range content and, the second binaural ultrasonic acoustic signal is perceived by a second user within the second listening zone as originating from a second virtual source location within the vehicle cabin.

18. The system of claim 1, wherein the first midrange speaker is one of a first plurality of midrange speakers together directing a first binaural midrange acoustic signal to the first listening zone, wherein the controller is configured to drive the first plurality of midrange speakers with the first midrange content of the first content signal, wherein the second midrange speaker is one of a second plurality of midrange speakers together directing a second binaural midrange acoustic signal to the second listening zone, wherein the controller is configured to drive the second plurality of midrange speakers with the second midrange content of the second content signal.

19. The system of claim 18, wherein the controller is configured to drive the first plurality of midrange speakers in an array configuration to produce the first binaural midrange acoustic signal in the first listening zone, wherein the controller is configured to drive the second plurality of midrange speakers in an array configuration to produce the second binaural midrange acoustic signal in the second listening zone.

20. The system of claim 18, wherein the controller is configured to drive the first plurality of midrange speakers such that a first binaural midrange acoustic signal is perceived by a first user in the first listening zone as originating from a first virtual source location within the vehicle cabin, wherein the controller is configured to drive the second plurality of midrange speakers such that a second binaural midrange acoustic signal is perceived by a second user in the second listening zone as originating from a second virtual source location within the vehicle cabin.

* * * * *